US011583143B2

(12) United States Patent
Lissandron

(10) Patent No.: US 11,583,143 B2
(45) Date of Patent: Feb. 21, 2023

(54) COFFEE GRINDER-DOSER APPARATUS WITH FAST RELEASE REMOVABLE GRINDING CHAMBER

(71) Applicant: FIORENZATO M.C. SRL, Milan (IT)

(72) Inventor: Luca Lissandron, Vigodarzere (IT)

( * ) Notice: Subject to any disclaimer, the term of this patent is extended or adjusted under 35 U.S.C. 154(b) by 208 days.

(21) Appl. No.: 17/100,899

(22) Filed: Nov. 22, 2020

(65) Prior Publication Data

US 2021/0153692 A1 May 27, 2021

(30) Foreign Application Priority Data

Nov. 22, 2019 (IT) .................. 102019000021885

(51) Int. Cl.
| | |
|---|---|
| A47J 42/44 | (2006.01) |
| A47J 42/36 | (2006.01) |
| A47J 42/40 | (2006.01) |
| A47J 42/50 | (2006.01) |
| A47J 42/16 | (2006.01) |
| A47J 42/18 | (2006.01) |
| A47J 42/38 | (2006.01) |
| A47J 43/07 | (2006.01) |

(52) U.S. Cl.
CPC .............. *A47J 42/44* (2013.01); *A47J 42/16* (2013.01); *A47J 42/18* (2013.01); *A47J 42/36* (2013.01); *A47J 42/38* (2013.01); *A47J 42/40* (2013.01); *A47J 42/50* (2013.01); *A47J 2043/0733* (2013.01)

(58) Field of Classification Search
CPC .. A47J 42/18; A47J 42/16; A47J 42/38; A47J 42/36; A47J 42/40; A47J 42/50
See application file for complete search history.

(56) References Cited

U.S. PATENT DOCUMENTS

| | | | | |
|---|---|---|---|---|
| 4,955,510 A | * | 9/1990 | Newnan .................. | A47J 31/42 221/268 |
| RE34,382 E | * | 9/1993 | Newnan .................. | A47J 31/42 222/362 |

(Continued)

FOREIGN PATENT DOCUMENTS

| | | |
|---|---|---|
| CN | 208524578 U | 2/2019 |
| DE | 3904983 A1 * | 2/1989 .............. A47J 42/56 |

(Continued)

OTHER PUBLICATIONS

Catalog and Manual for grinder-doser apparatus F83 Evo, of Italian company Fiorenzato S.p.a; accessed at www.fiorenzato.it.

*Primary Examiner* — Faye Francis
(74) *Attorney, Agent, or Firm* — Egbert, McDaniel & Swartz, PLLC

(57) ABSTRACT

A coffee grinder-loser apparatus has a removable grinding chamber that is extractable with a fast release. Grinding adjustment is independent of access to the grinding chamber. An interface flange is interposed between an adjusting ring nut and a fixed chamber of the grinding chamber. The flange makes an indirect coupling of the ring nut and of an extractable group of components to the fixed structure. A locking system includes levers with a cam tooth mounted externally on the interface flange. The cam tooth hooks a head of tie-rod assemblies with an elastic spring so as to place them in traction and joined to the fixed structure of the grinding chamber.

5 Claims, 8 Drawing Sheets

(56) References Cited

U.S. PATENT DOCUMENTS

| | | | | |
|---|---|---|---|---|
| 5,542,342 | A | * 8/1996 | McNeill | A47J 31/42 99/289 R |
| 5,671,657 | A | * 9/1997 | Ford | A47J 42/50 99/290 |
| 2015/0135966 | A1 | * 5/2015 | Hulett | A47J 42/50 99/289 R |
| 2016/0051082 | A1 | * 2/2016 | Tonelli | A47J 42/50 99/289 R |
| 2016/0316970 | A1 | * 11/2016 | Ryan | A47J 42/40 |
| 2017/0332831 | A1 | * 11/2017 | Lee | A47G 19/2205 |
| 2019/0117020 | A1 | * 4/2019 | Mazzer | A47J 42/24 |
| 2020/0015629 | A1 | * 1/2020 | Mazzer | A47J 42/40 |
| 2021/0106177 | A1 | * 4/2021 | Dunkelberg | A47J 42/38 |

FOREIGN PATENT DOCUMENTS

| | | | | |
|---|---|---|---|---|
| DE | 202008001749 U1 | * | 5/2008 | ............ A47J 31/42 |
| EP | 1762162 B1 | | 7/2015 | |
| EP | 3473148 A1 | | 4/2019 | |
| EP | 3698688 A1 | * | 8/2020 | ............ A47J 42/38 |
| IT | 1082436 B | | 5/1985 | |
| TW | M534579 U | * | 8/2016 | ............ A47J 42/20 |
| WO | WO-2016042324 A2 | * | 3/2016 | ............ A47J 42/08 |
| WO | 2019128077 A1 | | 7/2019 | |
| WO | WO-2021037546 A1 | * | 3/2021 | ............ A47J 31/42 |

\* cited by examiner

COFFEE GRINDER-DOSER APPARATUS WITH FAST RELEASE REMOVABLE GRINDING CHAMBER

CROSS-REFERENCE TO RELATED APPLICATIONS

Not applicable.

STATEMENT REGARDING FEDERALLY SPONSORED RESEARCH OR DEVELOPMENT

Not applicable.

Names of the Parties to a Joint Research Agreement

Not applicable.

Incorporation-by-Reference of Materials Submitted on a Read-Only Optical Disc, as a Text File or an Xml File Via the Patent Electronic System Not applicable.

Statement Regarding Prior Disclosure by the Inventor or a Joint Inventor

Not applicable.

BACKGROUND OF THE INVENTION

1. Field of the Invention

This invention relates to a coffee grinder-doser apparatus with fast release removable grinding chamber. In particular, the proposed solution makes the granulometric adjustment independent of the access to the grinding chamber, which occurs easily by means of slidingly extraction and lever hooking and releasing means.

2. Description of Related Art Including Information Disclosed Under 37 CFR 1.97 and 37 CFR 1.98

The innovation has particular, but not exclusive, application in the industrial sector of professional equipment for bars for the preparation of espresso coffee; in particular, a grinder-doser apparatus is proposed with an easily extractable grinding chamber, provided with a fast hooking and releasing system of the lever type. It is also pointed out that the proposed apparatus is particularly suitable for said grinding of coffee beans, however it is also suitable for the grinding of any dry foodstuff, in grain or seed.

In general, machines of professional type are widely known for the preparation of espresso coffee, conventionally called coffee machines, which substantially have a body including a boiler which generates hot water and vapour and sends them to one or more dispensing groups for the purpose of going through a corresponding number of filter-holder cups containing the ground coffee. They have to be thus preliminarily filled in the filter with the coffee powder in a specific machine suitable for grinding it and dosing it with precision, also called grinder-doser apparatus. In particular, said filter-holder cup has to be filled each time with the exact quantity of coffee powder according to the number of doses to be dispensed, of the intended quality, and pre-set granulometry or according to the relative distance between the two grinders which are arranged in a coplanar way between each other inside the grinding chamber in such a way as to adequately pulverize the unbroken coffee grains.

Among the most effective and widespread constructive configurations in the professional domain, there is in particular a barycentric-type arrangement with vertical rotation axis, wherein said grinding chamber is placed on said rotation axis in an intermediate position between the upper cone, which contains the unbroken coffee grains, and the lower machine body which acts as base and includes internally the motor and frontally the dispenser of said ground powder, immediately downstream of said grinders. The proposed solution of this invention refers to this preferred apparatus configuration, the advantage being in such cases maximized of the hooking and releasing of the grinding chamber and of the consequent removal, as described hereinafter. As a non-limitative example the configuration of barycentric type can be seen, with vertical rotation axis, of the grinder-doser apparatuses produced by the Italian company Fiorenzato S.p.a, 30036 Santa Maria di Sala (VE) www.fiorenzato.it, among which the model commercially called F83 Evo. It is observed, however, that the innovative solution proposed can be advantageously integrated also into devices of other typologies and configurations.

It has been thus noticed that an operator who uses this grinder-doser apparatus, during the daily professional practice, is sometimes obliged to disassembly the upper part of the apparatus for the purpose of accessing the inside of the grinding chamber, because of multiple reasons described hereinafter. However, it has been noticed that this operation is not easy and involves a lot of disadvantages, widely known to the operators of the sector.

Also with reference to the figures related to prior art (FIGS. 1b-1f), when said operator is going to access said grinding chamber, and therefore the rotary grinder-holder element on which the rotary grinder is fixed, he/she has to completely loosen the adjusting ring nut with the consequent extraction by unscrewing of the fixed grinder-holder element, on which the fixed grinder is fixed which, coupled with the rotary grinder, crushes the coffee beans according to a more or less fine, or rough, granulometry, according to the adjustment of said ring nut when all the components of the apparatus are assembled and are operative.

More in detail, the grinding is adjusted by means of clockwise or anti-clockwise rotation of the adjusting ring nut which brings the couples of grinders nearer or spaces them away, the granulometry being larger as the couple of grinders get farther, vice-versa the granulometry being finer as the couple of grinders get closer. Together with this constructive setting, it has been observed that the access to said grinders and therefore to the grinding chamber, takes place disassembling the coupling between the fixed grinder-holder element and said adjusting ring nut; in short, the adjusting ring nut has to be in any case completely loosen where the fixed grinder-holder element is coupled, on which the fixed grinder is fixed, each time losing said adjustment.

It has been noticed, in the daily professional practice, that for multiple reasons an operator has to disassembly said grinding chamber, to access it. Among them, a first reason relates to the periodic cleaning which has to be carried out to avoid the contamination of the coffee due to the prolonged deposit of ground powder inside it; a second reason is due to the periodic replacement of worn-out grinders. A third reason relates instead to the removal of extraneous objects which are sometimes present inside the coffee beans and which cause the blocking of the motor, the rotation driving shaft being directly connected to the rotary grinder-holder on which the fixed grinder is fixed.

For the purpose of determining the prior art relative to the proposed solution a conventional verification has been carried out in technical and patent literature, examining public archives, which has led to the identification of some prior art documents, among which:

D1 grinder-doser apparatus called F83 Evo, of said Italian company Fiorenzato S.p.a—www.fiorenzato.it;
D2 IT1082436 (Mazzer);
D3 EP3473148 (Mazzer);
D4 CN208524578 (Yang et al.);
D5 WO2019128077 (Chen et al.);
D6 EP1762162 (Fouquet).

D1 refers to electronic grinder-doser devices of professional type, with barycentric arrangement, where the grinding chamber is placed on the vertical rotation axis of the motor between the body of the apparatus placed below and the cone placed above containing the unbroken coffee beans; in said chamber, the upper grinder-holder element with the fixed grinder is mounted on a grinding adjusting ring nut provided with a threaded zone for manually rotating for the purpose of spacing out the two grinders or, where completely rotated, for the opening and/or the removal of the internal components. Said ring nut can be locked by combined means between each other; a safety microswitch is also integrated which blocks the motor in the absence of said container cone.

D2 proposes a continuous and micrometric grinding adjustment system, which allows the elimination of clearances and interferences, for coffee grinding devices where the grinding chamber is interposed on vertical axis, between the motor and the bean retaining cone, and includes a couple of superimposed circular grinders.

In D3 a modern coffee grinder-doser apparatus is described where the body of the apparatus contains a grinding chamber above the motor including a first and a second grinder, which are spaced in such a way as to grind the coffee beans into powder and also to adjust their granulometry by means of a manually rotary external ring nut, provided with reference angle indexes, which is integrally connected to the fixed upper grinder and is screwed on the fixed part of the grinding chamber in such a way that, when rotating, it varies the reciprocal distance between the grinders. In particular, said external ring nut is associated to a graduated ring and a blocking removable cover.

D4 proposes a blocking system of the rotation of a grinding chamber, by means of integrated spring pins acting on the supporting plane.

In D5 a system is described for adjusting and fixing the grinding means including multiple concentrical elements assembled into each other, which can be spaced in such a way as to adjust the distance between the grinders or the granulometry, and with a ring flange which supports them and which is fixed with screws to the body placed below including the motor of the grinder apparatus.

D6 proposes an apparatus for dispensing coffee powder which can be combined with means for grinding the unbroken grains, which can be mounted in a removable manner in the upper part of the apparatus. In particular, a system is described of fast locking of said removable means for grinding, consisting of an elongated and flexible element which is vertically integrated sideways and is provided at the upper end with an interfering protrusion retaining from the outside, for the whole height, the removable elements which form the grinding chamber in such a way as to lock them in the correct working position or unlock them, after releasing said protrusion.

It can be reasonably agreed that, in general, the known solutions of coffee grinder-doser devices with grinding chamber axially interposed between the upper cone and the lower body—motor, are very effective during the grinding, namely when all the components are assembled and adjusted. However, they do not facilitate the maintenance, the access being, in particular, slow and not easy inside the grinding chamber.

Furthermore, in the professional practice it has been noticed that the operations described above, and in particular said periodic cleaning and said periodic replacement of the grinders, are often neglected or overly postponed by the operators to avoid these and other working difficulties, well known to the operators of the sector. Consequently, the grinding service is sometimes not optimal from the qualitative point of view. For the purpose of highlighting the advantages of the proposed solution, the main problems or drawbacks are hereinafter described in detail which limit the execution of the aforementioned disassembly operations or make them difficult.

More in detail, a first serious drawback which characterizes the known solutions with micrometric adjustment of the grinding by means of rotary ring nut, among which D1-D3, consists in the fact that said granulometric adjustment is lost each time said grinding chamber is disassembled. It is indeed known that for accessing the grinding chamber the adjusting ring nut has to be necessarily completely loosen, by unscrewing the coupling thread between said ring nut and the structure of the grinding chamber until extracting the upper grinder-holder element including the fixed grinder; the figures of prior art (FIGS. 1b-10 can be seen, as mere examples, which are also referable to the above-mentioned solution D1.

A second drawback, consequent to the first, relates to the exact granulometric adjustment. This operation, indeed, is not immediate and involves multiple attempts for the purpose of obtaining again the desired adjustment, with a waste of ground coffee powder and also a waste of time for the operator.

A third drawback relates to said assembly and disassembly operations and namely the coupling between said ring nut and the fixed grinder-holder element, because it is known that coffee powder tends inevitably to settle on the coupling thread between said ring nut and the structure of the grinding chamber; the figures of prior art (FIGS. 1d, 1f) can be seen as examples. Said settled powder, indeed, being in contact with the antiseizure food grease which is present in the whole threaded zone, forms a mixture of greasy material which is hardly removable and progressively degrades the surfaces of the threads themselves, compromising the functionality. It has been indeed noticed that, if the cleaning of said threaded zone is neglected, the adjusting ring nut does not correctly screw.

A fourth drawback relates again to the difficult lubrication of said coupling thread between the ring nut and the structure of the grinding chamber; it has been indeed noticed that in the long term, if said lubrication is not correctly carried out and maintained, the smoothness of the two directly coupled parts is rapidly compromised, with consequent blocking of the grinding adjusting ring nut. The figures of prior art (FIGS. 1d, 1f) can be seen as examples.

A fifth drawback relates to the operation of changing grinders, as to such aim it is necessary to use metallic tools, such as screwdrivers, pliers or similar manual tools, which may accidentally damage the crests of said coupling thread between the ring nut and the structure of the grinding chamber, said crests protruding from said structure of the chamber and namely being outwardly exposed. Consequently, also in this case it is no longer possible to correctly screw the adjusting ring nut, with serious discomfort and additional costs. The figures of prior art (FIG. 1f) can be seen as examples.

It has been also noticed that the known locking solutions by means of screws inserted on the edge of a support flange to engage to the body placed below, such as for example in D5, are not easy and do not allow a fast manual disassembly to any operator, also requiring specific tools such as screwdrivers; the drawbacks already mentioned are caused such as delays in the maintenance. Moreover, the known solutions suitable for locking and unlocking rapidly a grinding chamber by means of an elongated and flexible element with interference at the end, which locks the whole group from the exterior in the working position, as per in D6, are not suitable for coffee grinder-doser apparatuses of professional type because they are not easily actuated, they do not ensure absolute repeatability and precision, they do not allow to predefine the locking force and do not ensure absolute action coplanarity of the grinders.

Considering all the above, the need is reasonable for the firms of the sector to identify solutions which are innovative and able to overcome at least the problems previously identified.

BRIEF SUMMARY OF THE INVENTION

These and other aims are reached with the present invention according to the characteristics of the appended claims, solving the described problems by means of a coffee grinder-doser apparatus (1) with removable grinding chamber for extraction (10), with fast release; the proposed solution makes the adjustment of the grinding independent of the access to the grinding chamber and simplifies the maintenances for the operator. An interface flange (113) is provided, interposed in univocal position between the adjusting ring nut (115) and the fixed structure (112) of the chamber, which flange makes the coupling indirect of the ring nut and of the extractable group (101) to said fixed structure, being screwed into said flange which is instead slidingly inserted. The locking provides a hooking and releasing system of fast and tensioned type, by means of levers (102) with cam tooth (123) mounted outside on said interface flange, which engage hooking the head of corresponding tie-rod groups (106) with elastic spring, putting them in traction, which are joined to said fixed structure of the chamber.

In this way, through the considerable creative contribution the effect of which constitutes an immediate and non-negligible technical progress, several and important aims are achieved.

A first aim has been to allow the operator to access the grinding chamber in a much faster and easier way, with respect to the known and conventional solutions. To this aim, in the grinder-doser apparatus an innovative grinding chamber is integrated of the type with fast release, slidingly extractable, which is made in such a way as to advantageously solve all the problems described above.

A second aim has been to insulate the threaded coupling of the adjusting ring nut from the deposits of coffee powder and from possible hits which may compromise the successive screwing.

A third aim, linked to the previous one, has been to avoid the removal of the lubricant grease from said threaded zones, constantly ensuring an optimal smoothness of the granulometric adjusting ring nut; this advantage is particularly useful in the adjusting phases of the end of adjustment.

A fourth aim has been to eliminate the need to loosen the adjusting ring nut for the purpose of carrying out said periodic cleaning of the grinding chamber or said change of worn-out grinders, or still to remove the extraneous objects which are possibly present among the coffee grains, which sometimes block the motor rotation with the consequent blocking of the grinding.

A fifth aim has been to make the necessary operations considerably easier and faster relative to the maintenance and cleaning of the grinding chamber and of its internal components, making them executable by any operator and not only by technicians of the sector who are experts in the maintenances. Consequently, with more frequent and correctly executed maintenances, the condition of the apparatus, its duration and the quality of the service are improved, with considerably reduced overall costs.

Another aim has been to realize a system of hooking and releasing and of extraction of the grinding chamber which is suitable for intense professional use and can be used by any operator even if unskilled, consisting of a limited number of mechanical components which can be intuitively actuated without the help of tools, to reach the abovementioned aims in a way which is technically advanced, repeatable and economical.

An additional aim has been to realize a safer grinding chamber from the hygienic point of view.

These and other advantages will appear from the following detailed description of some preferred embodiments with the aid of the enclosed schematic drawings, whose execution details shall not be considered limitative but only illustrative.

BRIEF DESCRIPTION OF THE SEVERAL VIEWS OF THE DRAWING(S)

FIG. 1a is a side schematic orthogonal view of an electronic grinder-doser apparatus suitable for grinding and dosing coffee beans, having an execution configuration of barycentric type with motor in the lower body or base, vertical rotation axis and bean-retaining cone aligned above it, wherein the grinding chamber is interposed between the upper cone and the lower body and is evidenced in a dashed rectangle to facilitate the understanding. In particular, the invention refers to an innovative grinder-doser apparatus provided with a fast release extractable grinding chamber (FIGS. 2-8), which is advantageous if compared to a grinding chamber of conventional type made according to the prior art (FIGS. 1b-1f).

FIGS. 1b, 1c, 1d refer to the prior art and represent, respectively: an axonometry, a view from above and a section in correspondence with the section plane X1-X1 of an assembled grinding chamber, where the threaded coupling is evident between the grinding adjusting ring nut and the fixed structure of the chamber which includes rotary grinder and grinder-holder element.

FIGS. 1e, 1f refer to the prior art and represent, respectively: an axonometry of said conventional grinding chamber, as in the previous figures (FIGS. 1b-1d) where the central group is here removed for complete unscrewing, and a centreline section in correspondence with said section plane X1-X1. The centrally removable group includes the fixed grinder-holder element, the fixed grinder and the grinding adjusting ring nut provided with a threaded zone exposed at the exterior to directly engage with screwing on a corresponding threaded zone inside the fixed structure.

FIGS. 2a, 2b, 2c are simplified axonometric views of the grinding chamber with fast release proposed by this invention, represented in semitransparency to facilitate the understanding, being first mounted in working position (FIG. 2a), then released with open levers (FIG. 2b) and then extracted (FIG. 2c). Said grinding chamber has side locking levers which are hooked on corresponding elastic tie-rods and is extractable with axial sliding, without screwing. The micrometric adjustment of the grinding is permanent namely it remains unchanged also after the operation of extraction and reinsertion, as to such aim the grinding ring nut does not have to be rotated and therefore the relative distance is not modified between the lower rotary grinder and the upper fixed grinder.

FIGS. 3a, 3b, 3c and 4a, 4b, 4c are orthogonal views of the grinding chamber proposed by the invention, in closed position with hooked levers (FIGS. 3a-3c) and in open position with released levers (FIGS. 4a-4c); such figures are represented from above (FIGS. 3a, 4a), in vertical section corresponding to the section plane X2-X2 (FIG. 3b) and to the section plane X3-X3 (FIG. 4b), and with an enlarged detail (FIGS. 3c, 4c) of the lever-tie-rod group, as per the dashed rectangle in the respective section. FIG. 5 is a vertical section in correspondence with said section plane X3-X3, as in the previous figures (FIGS. 4a-4b), where the grinding chamber is extracted for sliding on vertical axis, longitudinally to the apparatus namely with movement parallel to the rotation axis of the motor.

DETAILED DESCRIPTION OF THE INVENTION

Figure 1A:
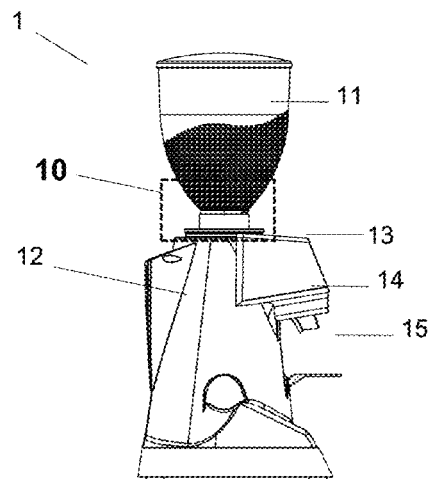
Figure 1B:
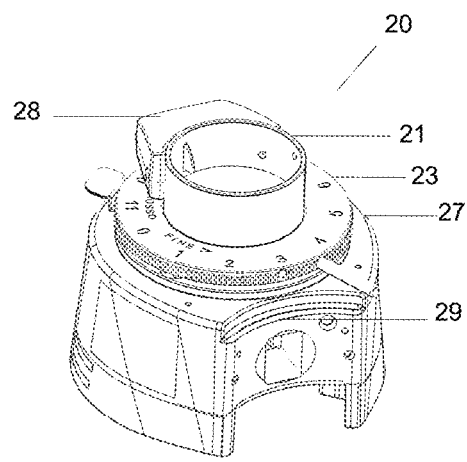
Figure 1C:
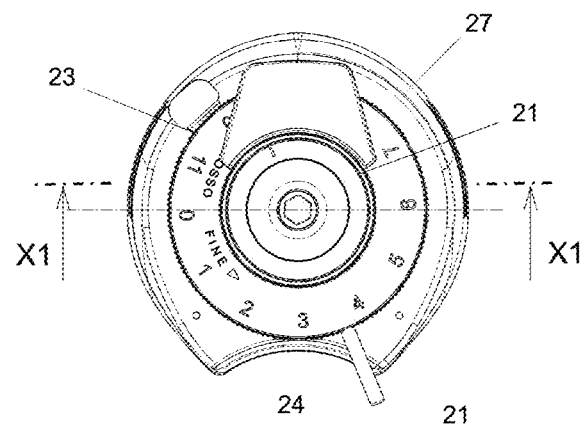
Figure 1D:
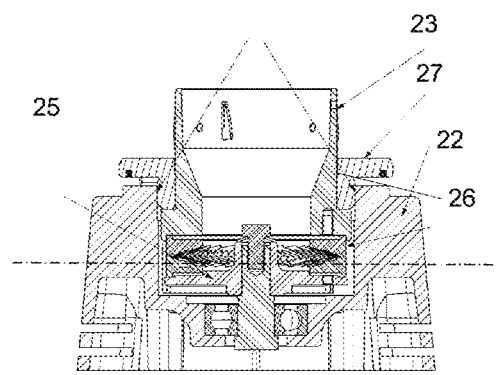
Figure 1E:
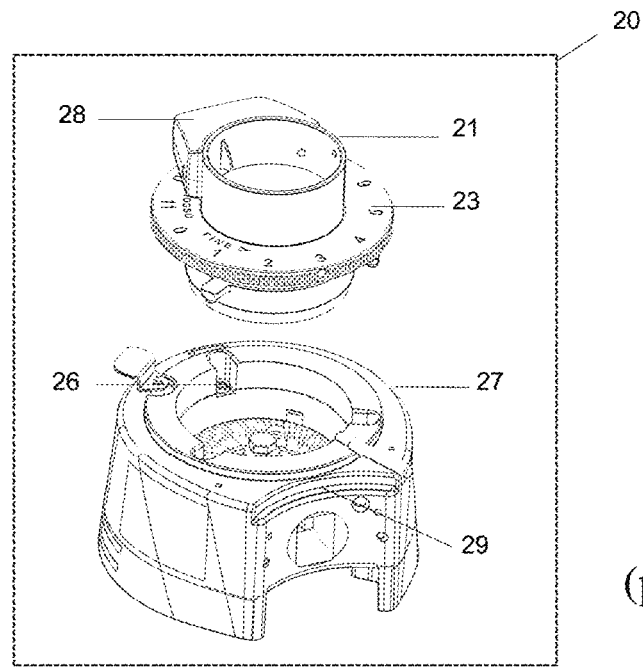
Figure 1F:
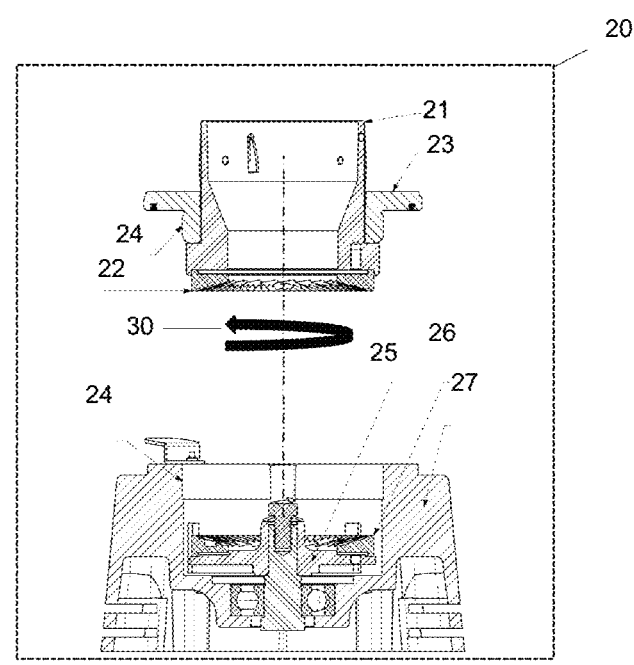

With reference to the figures (FIGS. 1a, 2-8) as well, the proposed invention refers to an electronic grinder-doser apparatus (1) suitable for grinding and dosing coffee beans, which is particularly provided with an advantageous grinding chamber with fast release (10) which is extractable for guided axial sliding. The micrometric adjustment of the grinding, also called granulometric or fine adjustment, remains unchanged also after the opening of said grinding chamber (10), the pre-set setting being namely maintained constant.

The invention is based on the integration of an innovative interface element shaped like a ring flange, called interface flange (113), which is interposed between said granulometric adjusting ring nut (115) and the fixed structure (112) of the grinding chamber in such a way as to separate the coupling function from the adjustment function, insulating the threaded zone. Said interface flange (113) is also provided with fast hooking means, of the type with lever (102), which considerably simplify the operations of opening and repositioning of the grinding chamber or, more precisely, of its removable parts.

Figure 2A:
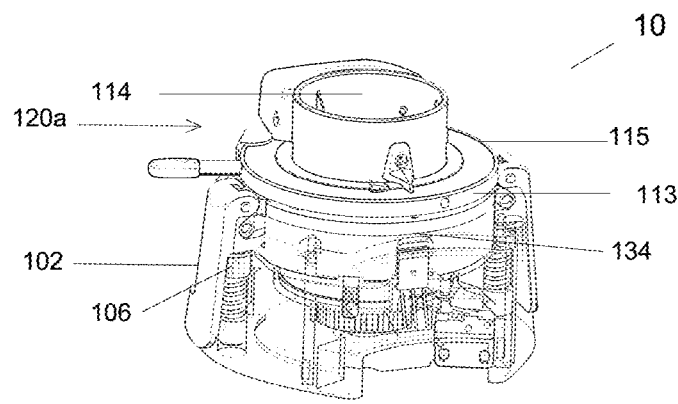
Figure 2B:
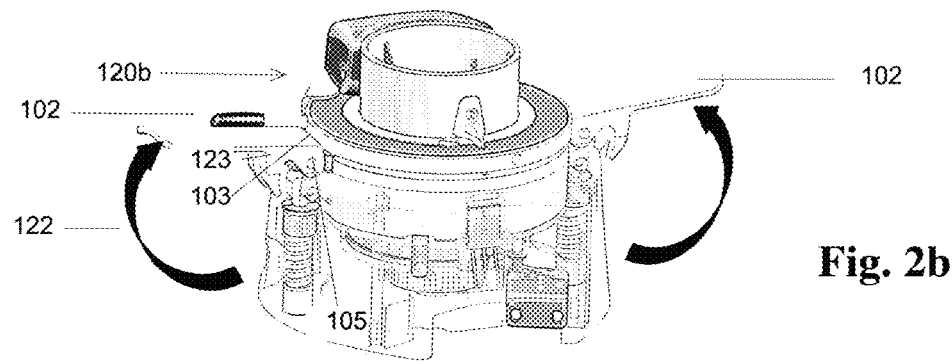
Figure 2C:
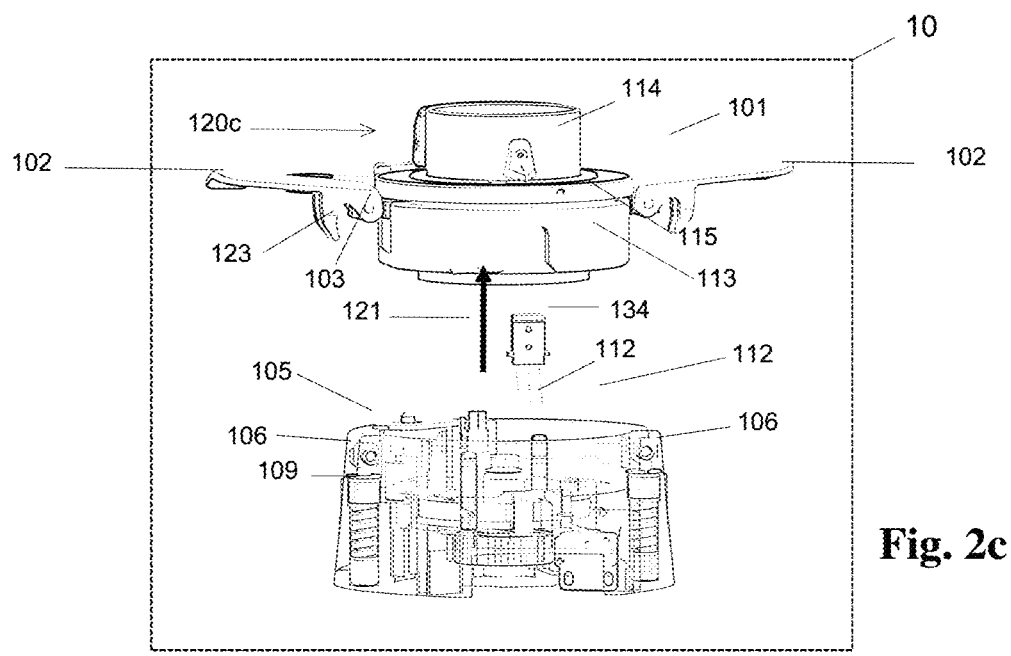
Figure 7:
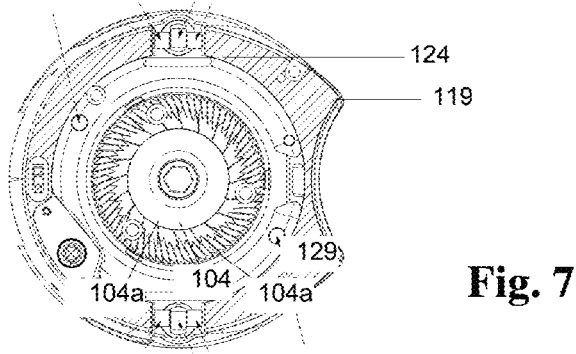
FIG. 7 represents a horizontal section referred to the previous view, in correspondence with the section plane X5-X5.
Figure 8:
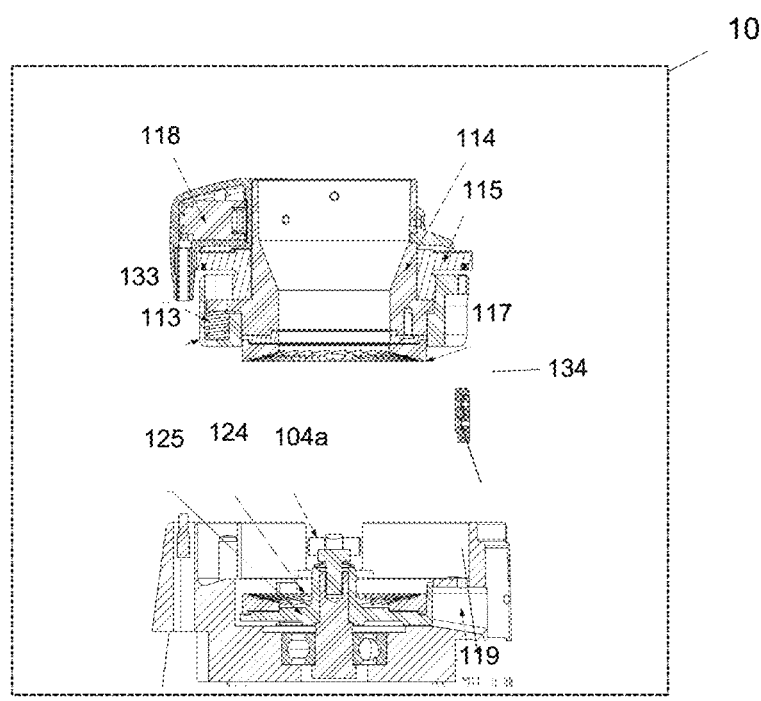
FIG. 8 represents the grinding chamber according to this invention, in a vertical section corresponding to said section plane X5-X5 (FIG. 4a), where it is in open position with the group provided with fixed grinder which is extracted by means of an interface flange, from which a coffee-breaking plate is in turn extracted.

Said adjusting ring nut (115), in the proposed solution (10), is conventionally actuated with manual screwing by means of screw thread for the purpose of reciprocally spacing out the upper fixed grinder (117) from the lower rotary grinder (125), but advantageously engages on said interface flange (113) and not directly on the fixed structure (112) of the grinding chamber, as instead it happens in the prior art. In short, said interface flange (113) acts as support element in which said ring nut (115) is integrated previously coupled to the multiple removable components (114-117) of the grinding chamber, behaving like an extractable group (101) for sliding. Therefore, the coupling surface of said interface flange (113) is externally smooth and configured in such a way as to slidingly engage (121) on longitudinal axis in said fixed structure (112), thus avoiding the conventional and disadvantageous screwing; guiding and centring means are preferably provided, such as cylindrical pegs (129) suitable for ensuring a positioning which is univocal, precise and repeatable (FIGS. 2c, 7). The locking-unlocking of the flange (120b) takes place at the end of stroke, with the group inserted (101, 113-117), with fast hooking and releasing means of the type with lever (102, 113) with corresponding connecting elements of the type with elastic tie-rod (106) constrained to the fixed structure (112).

In the preferred execution configuration (FIGS. 2a-2c), the access to the grinding chamber (10) occurs in an extremely fast way by means of the release of two opposite levers (102) with respect to the rotation axis of the motor (127), joined to said interface flange (113) and externally hooked to the sides of the fixed structure (106, 112). Said levers (102) and said flange (113) allow the fast and complete extraction of the extractable group (101). Said extractable group (101) is thus the upper and removable part of the grinding chamber (112), it includes outside said ring nut (115) and inside the fixed grinder-holder element (116) and the fixed grinder (117); it (101) is screwed to the interface flange (113) by means of a threaded zone (126) which preserves the spacer supporting original function of said ring nut (115). It (113), in turn, includes hooking and releasing levers (102) constrained in rotation on fulcrum (103) with transverse pin.

Preferably, two opposite levers (102) are provided, which comprise a shaped tooth with the form of a little fork with cam, also called cam hooking tooth (123), in such a way as to ensure the safe locking of the whole extractable group (101) once slidingly inserted and hooked to the fixed structure (112) of the grinding chamber. The hooking occurs by means of a hooking and releasing tie-rod means, of the type with elastic spring, which includes multiple components and is conventionally called tie-rod group (106); it is vertically integrated in correspondence with each lever (102, 123), with the lower end fixed to the fixed structure (112) and with the opposite end protruding upwards like a head suitable for the hooking of said lever (102, 123) (FIGS. 2a-2c, 3c, 4c).

Said grinding adjusting ring nut (115), already coupled to said fixed grinder-holder element (116) which is joined to the fixed grinder (117), is screwed into said interface flange (113) by means of a coupling threaded zone (126) between the external surface of the ring nut and the internal surface of the flange. This solution totally insulates said threaded coupling (126) from the coffee powder and from the possible hits during the phases of maintenance and inspection of the grinding chamber; moreover, this solution maintains the granulometric adjustment unchanged as it is not necessary to loosen said adjusting ring nut (115) when accessing the grinding chamber (10).

Consequently, once said extractable group (101,113 117) is slidingly extracted it is possible to easily remove also the coffee-breaking plate (134) which is advantageously inserted into said interface flange (FIGS. 2c, 6a, 7, 8); this plate (134) is generally present in grinder-doser apparatuses of professional type which ensure a high quality of the service, being composed of a harmonic steel membrane which dampens the electrostatic phenomena and the occurring of lumps of ground powder coming from the grinding chamber. In the proposed solution (10), the removal of said coffee-breaking plate allows the execution of an accurate cleaning of the outlet opening of the ground coffee for the operator, without damaging the combs which form it. With regards to this, it is observed that in the known and conventional solutions, without said interface flange, this coffee-breaking plate is fixed and is not manually removable, in an easy way, therefore the operator cannot often carry out an accurate cleaning.

Said tie-rod group (106) is configured like an elastic tie-rod mainly composed of a central pin (111) and of a spring (109), on which pin a fixing bush (108) is inserted and said spring (109) which actuates the elastic tensioning being preloaded by a spring-retainer (110). At the end of the central pin (111) of the spring a sliding pin (105) for bushes is inserted, with two bushes (104) preferably made of sintered brass. The assembly of these components forms said tie-rod group (106) which acts as a connecting element resisting to the traction and also elastic, to facilitate the fast hooking and releasing of each lever; said tie-rod group (106), with the lower end joined and locked in an integration seat obtained in the fixed structure (112) of the grinding chamber, by means of a threaded zone which is present both in the fixing bush (108) and in said seat, in reciprocal correspondence for the purpose of a fixing by screwing.

Figure 3A:
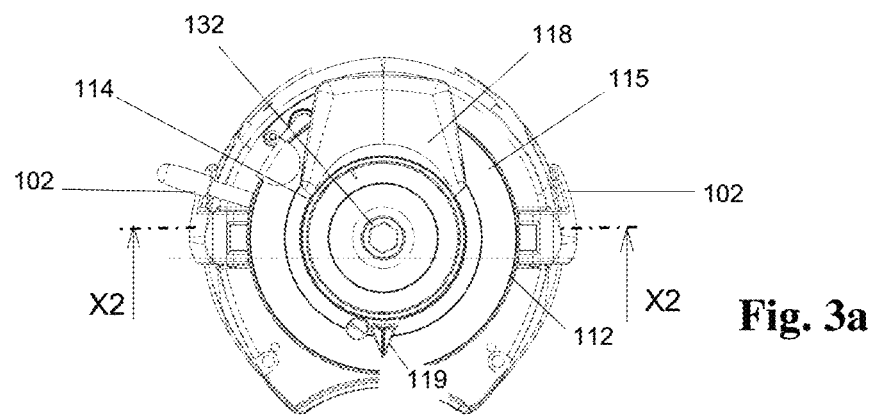
Figure 3B:
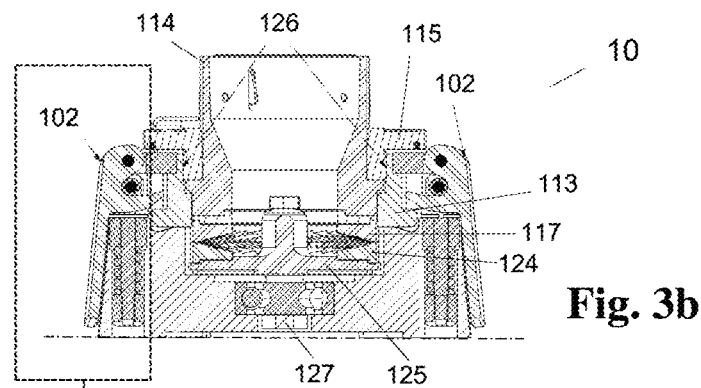
Figure 4A:
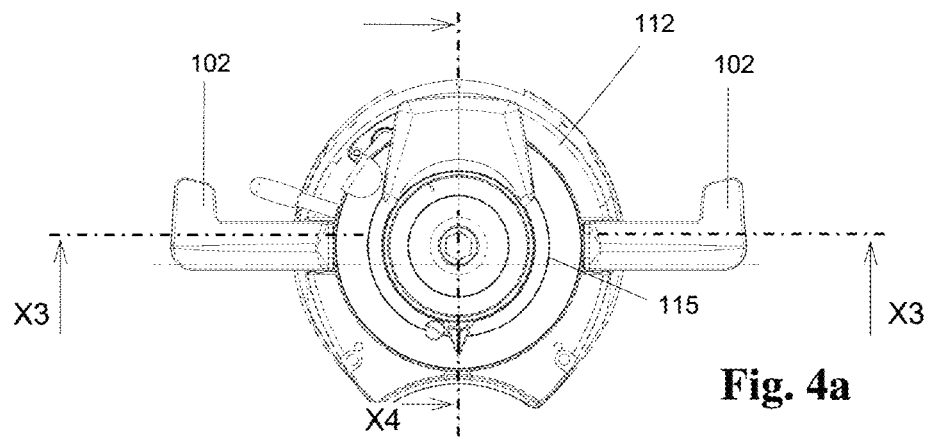

The fast hooking and releasing system provided by the present innovation provides, preferably, two tie-rod groups (106) and two corresponding levers (102), wherein each lever-tie-rod couple (102, 106) is opposed to the other couple (102, 106) in diametrically opposite position with respect to the central rotation axis, for an effective balance of the forces (FIGS. 3a, 4a). In this way, after inserting by guided sliding said extractable group (10, 101) into a corresponding seat obtained directly in the fixed structure (112), where two centring cylindrical pegs (129) are also included which ensure its (101) correct positioning, it is possible for an operator to hook by the head each tie-rod group (106a) (FIG. 2a) or release it (106b) (FIG. 2b), by means of the activation by rotation of said two opposite levers (102).

Figure 4B:
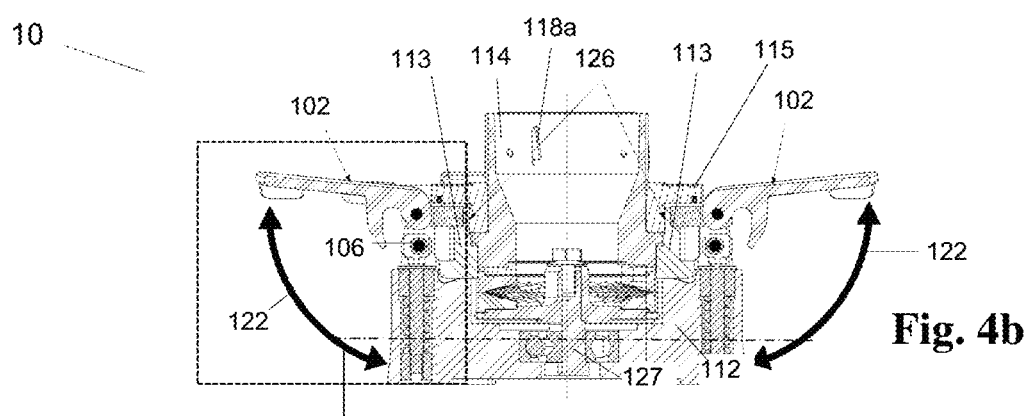

Operatively, the kinematic motion made with the two lever-tie-rod couples (102, 106) is intended to lock the extractable group (101) with a simplified and safe grip on the protruding head of said tie-rod group (106), by means of the cam hooking tooth (123), and then rotating the two levers (102) downwards in such a way as to put in traction the system pin—spring (109, 111) (FIG. 4b). On the contrary, the same kinematic motion allows to rapidly release the extractable group (101) rotating the same levers (102) in the opposed direction, namely upwards, until releasing the grip of the tooth (123) and freeing each tie-rod group (106) (FIGS. 2b, 4b, 4c), to then allow an easy extraction by sliding of said extractable group (101) (FIGS. 2c, 5).

More in detail on the advantageous action of said tie-rod group (106) (FIG. 4c), the cam profile of the hooking tooth (123) is intended to progressively put in traction said spring (109) which is preloaded, in such a way as to reach, once both said opposite levers (102) are completely hooked and its (109) operational stroke (104, 107a-107b, 131) is completed, a value of the locking force equal to about 40 kg, considering as a whole all the lever-tie-rod couples (102, 106) which act on said extractable group (101). It is noticed that said locking force, generated by said springs (109), acts uniformly and exclusively on the supporting and contact plane (128) of the interface flange (113), and on the respective supporting plane in the fixed structure (112) of the grinding chamber (10), in such a way as to ensure coplanarity or parallelism between these coupled elements and maintain, as a result, the alignment and the coplanarity of the grinders (116-117, 125) during the grinding also after multiple extractions and repositioning (FIGS. 2c, 5).

It has been then experimentally verified that with the above-mentioned fast hooking and releasing means (102, 106, 109) and the above-mentioned interface flange (113) a predefined locking force is exerted and a univocal actuation is ensured of the locking on said supporting and contact base (128), in correspondence with the end of stroke of the sliding (113), like a safe or anti-mistake positioning.

Figure 3C:
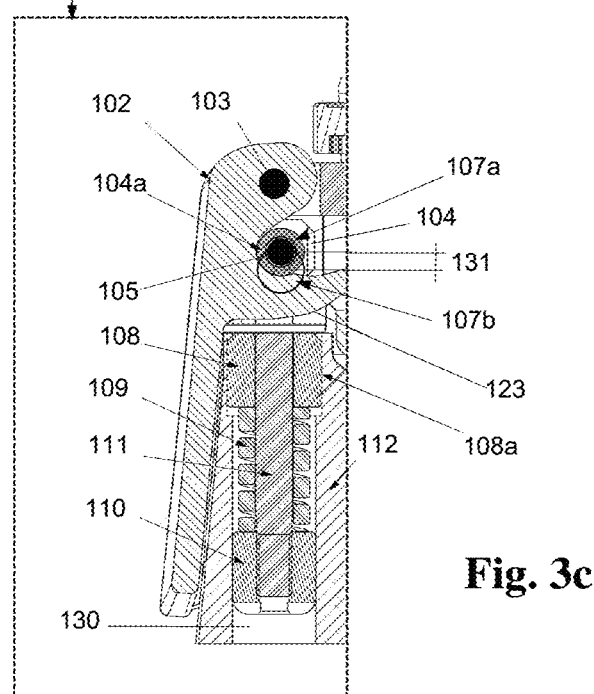
Figure 4C:
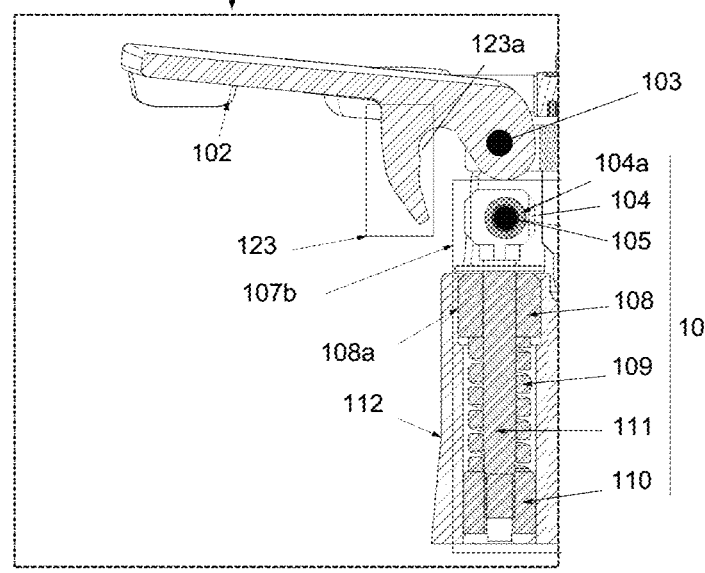
Figure 5:
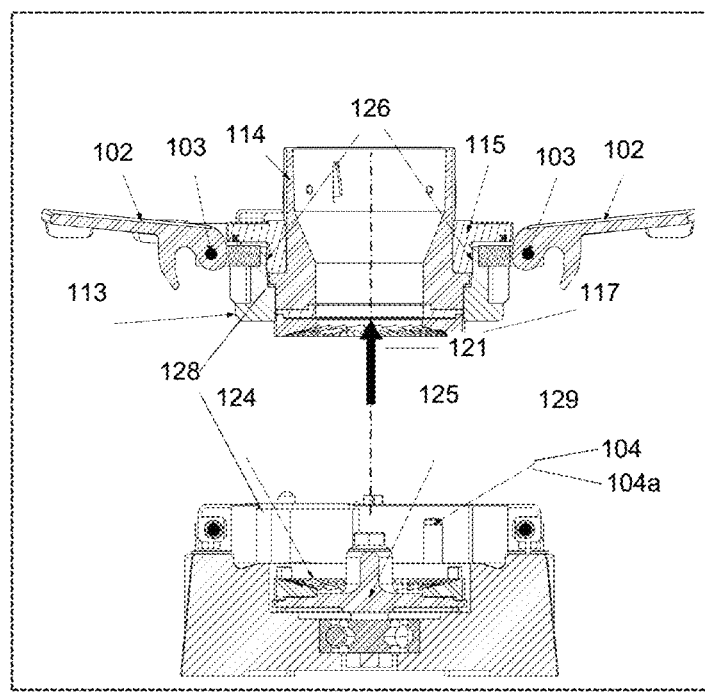

Furthermore, in the preferred execution configuration, during the hooking of the lever (102) said cam profile of the tooth (123) puts in traction the spring (109) of the tie-rod group (106) with a progressively greater force, until reaching a security seating (123a) having an anti-accidental release function (FIGS. 3c, 4c).

Figure 6A:
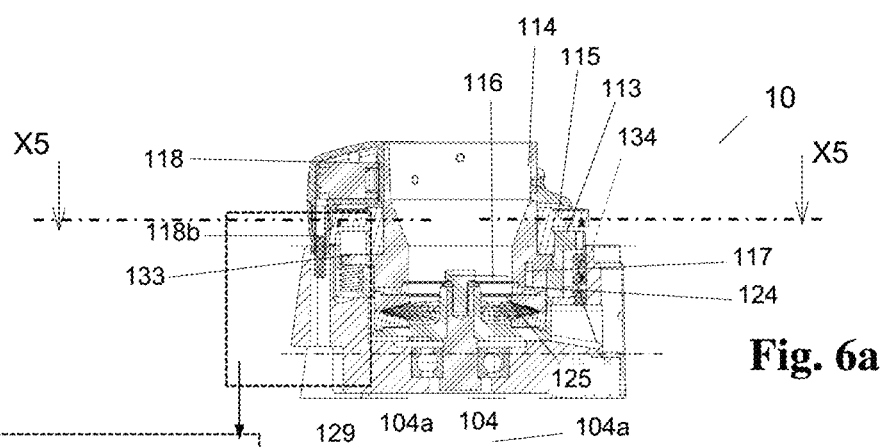
FIGS. 6a and 6b represent said grinding chamber in a vertical section and an enlarged detail in correspondence with the section plane X4-X4 (FIG. 4a), being mounted and locked in working position, with also a safety system including a switch, and where the integration can be seen of the coffee-breaking plate at the outside of the interface flange.
Figure 6B:
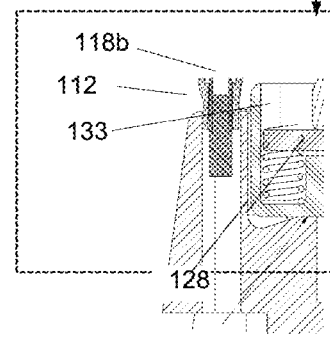

The proposed system advantageously allows to integrate the most improved safety systems provided for this type of grinder-doser apparatuses such as, for example, an external microswitch (118, 118b) with spring button (118a) which blocks the motor when the container of the coffee beans is not correctly inserted into said central body (104) (FIGS. 6a, 6b).

Nomenclature (1) coffee grinder-doser apparatus suitable for grinding and dosing coffee beans;
(10) grinding chamber removable for extraction, with fast release, according to the present invention. The micrometric adjustment of the grinding remains unchanged also after the opening of said grinding chamber, being mounted on a slidingly extractable interface flange, equipped with closure levers;
(11) cone-shaped container for coffee beans;
(12) body of the grinder-doser, with motor with vertical rotation axis;
(13) control electronics;
(14) dispensing spout;
(15) support fork of the filter-holder cup;
(101) slidingly extractable group of the grinding chamber;
(102) rotation closure lever, with fast and easy release, with cam hooking tooth;
(103) pin—fulcrum for lever;
(104) head of the tie-rod group;
(104a) bush suitable for being engaged to the tooth of the lever, being for example made of sintered brass;
(105) sliding pin of the bushes;
(106) tie-rod group;
(107a) hooked tie-rod group, in closed position;
(107b) released tie-rod group, in open position;
(108) fixing bush of the tie-rod group;
(108a) bush screw thread;
(109) spring of the tie-rod group;
(110) spring-retainer of the tie-rod group;

(111) pin of the tie-rod group, for spring;
(112) fixed structure of the grinding chamber;
(113) interface flange, slidingly extractable on longitudinal axis, and namely parallel to the rotation axis of the motor;
(114) central body of the extractable group;
(115) grinding or granulometric adjusting ring nut;
(116) fixed grinder-holder element;
(117) fixed grinder;
(118) safety microswitch;
(118a) button;
(118b) microswitch connection cable connector;
(119) ground coffee outlet opening;
(120a) configuration of the extractable group with locked flange;
(120b) configuration of the extractable group with released flange;
(120c) configuration of the extractable group with extracted flange;
(121) axial extraction movement, on longitudinal axis parallel to the axis of the motor;
(122) rotation movement of the levers, on a fulcrum integral with the interface ring nut, oriented outwards with respect to it;
(123) hooking tooth of the lever of cam type;
(123a) cam profile, with seating to facilitate the hooking;
(124) rotary grinder;
(125) rotary grinder-holder element;
(126) ring nut—interface flange coupling threaded area;
(127) rotation axis of the motor, arranged vertically on the longitudinal axis of the apparatus;
(128) supporting plane of the interface flange on the fixed structure of the grinding chamber;
(129) centring cylindrical peg of the grinding chamber—group, which is slidingly extractable;
(130) integration seat of the tie-rod group;
(131) operational stroke of the spring of the tie-rod group;
(132) fixing screw of the rotary grinder-holder element;
(133) grinder-holder contrast spring;
(134) extractable coffee-breaking plate, integrated into the interface flange.

With reference to the prior art (FIGS. 1b-1f):
(20) screwing grinding chamber, of conventional type;
(21) fixed grinder-holder element;
(22) fixed grinder;
(23) grinding adjusting ring nut;
(24) thread for the coupling of ring nut—structure of the grinding chamber;
(25) rotary grinder-holder element;
(26) rotary grinder;
(27) fixed structure of the grinding chamber;
(28) safety lock;
(29) ground coffee outlet opening;
(30) screwing of ring nut—fixed structure.

The invention claimed is:
1. A coffee grinder apparatus comprising:
a lower body;
a motor positioned in said lower body, said motor having a shaft with a vertical rotation axis;
an upper cone configured to retain coffee beans, said cone positioned above said lower body;
a grinding chamber removably positioned between said upper cone and said lower body, said grinder chamber comprising:
a load-bearing element having an upper mouth, the upper mouth receiving said upper cone therein;
a rotary grinder positioned inside said grinding chamber;
a grinder-holder element having a fixed grinder, said grinder-holder element having an adjusting ring nut at an exterior thereof, said adjusting ring nut being a spacer support that rotatably adjusts a height being, the fixed grinder and said rotary grinder, said grinding chamber being integrated into an upper portion of said lower body, the adjusting ring nut having a threaded coupling zone on an exterior thereof; and
a coffee-breaking plate at an exit of said grinder chamber, said coffee-breaking plate configured to dampen electrostatic phenomena and to reduce coffee powder clumps, wherein said load-bearing element and said rotary grinder and said grinder-holder element and said coffee-breaking plate are an extractable group of components that are removable from said grinder chamber by an axial slide inserted into a fixed portion of said grinder chamber and is locked in a position in said grinder chamber by a lock having a lever with a tie-rod assembly and a spring, wherein the extractable group of components has an interface flange between the adjusting ring nut and the fixed portion of said grinder chamber, the interface flange having a threaded zone interior thereof, the threaded zone of the interface flange screwing into the threaded coupling zone of the adjusting ring nut, the interface flange being externally smooth and configured to slide in the fixed portion of said grinder chamber in parallel relation to the vertical rotation axis, the interface flange having a centering element adapted to drive an insertion movement and an extraction movement of the extractable group of components, wherein the lock locks the interface flange with a predetermined locking, force and acts on a supporting plane that corresponds to an end of a stroke of a sliding of the interface flange in the fixed portion of said grinder chamber.

2. The coffee grinder apparatus of claim 1, wherein the lock is arranged in association first couple and a second couple, each of the first and second couples has a rotary and the lever and the tie-rod assembly, the lever having a fulcrum integral with the interface flange, the lever having a hook tooth that protrudes toward the fixed portion of said grinder chamber so as to hook and release the tie-rod, the tie-rod assembly being inserted and constrained in an integrating seat thereof, the tie-rod assembly having a central pin, the central pin being a core of a preloaded spring of the tie-rod assembly, the central pin having a head that protrudes so as to hook the hooking tooth, the head being translatable along a longitudinal axis, wherein the first and second couples act uniformly on the supporting plane so as to maintain said fixed grinder and said rotary grinder in coplanar relationship.

3. The coffee grinder apparatus of claim 2, wherein the hooking tooth of the lever has a cam profile, the cam profile putting the spring in traction in a hooking phase.

4. The coffee grinder apparatus of claim 3, wherein the lock exerts a locking force on the supporting plane by the preloading spring.

5. The coffee grinder apparatus of claim 1, wherein said coffee-breaking plate is inserted into the interface flange in a seat exteriorly oriented so as to be removable with the extractable group of components.

* * * * *